United States Patent [19]
Lin

[11] Patent Number: 6,005,674
[45] Date of Patent: Dec. 21, 1999

[54] SYSTEM ARCHITECTURE FOR MULTIPLE INPUT/OUTPUT DEVICES

[76] Inventor: Feng Lin, No. 14-36, Blk 513, Jurong West Street 52, Singapore 640513, Singapore

[21] Appl. No.: 08/607,628

[22] Filed: Feb. 27, 1996

[51] Int. Cl.$^6$ .............................. H04N 1/00; H04M 11/00
[52] U.S. Cl. .......................... 358/437; 358/434; 358/468; 379/100.01; 379/100.12; 395/733
[58] Field of Search ..................................... 358/437, 400, 358/434, 435, 436, 438, 439, 468, 442, 444; 379/100.01, 100.15, 106.01, 100.12; 375/222; 395/733, 737, 741; H04N 1/00

[56] References Cited

U.S. PATENT DOCUMENTS

| | | | |
|---|---|---|---|
| 4,707,832 | 11/1987 | Glenn et al. .............................. | 370/124 |
| 4,771,335 | 9/1988 | Obara ...................................... | 358/258 |
| 4,910,610 | 3/1990 | Utsugi ..................................... | 358/435 |
| 4,974,254 | 11/1990 | Perine et al. ............................. | 358/435 |
| 5,170,266 | 12/1992 | Marsh et al. ............................. | 358/468 |
| 5,442,457 | 8/1995 | Najafi ...................................... | 358/400 |
| 5,497,247 | 3/1996 | Yoshida ................................... | 358/436 |

OTHER PUBLICATIONS

"TR Series Boards Technical Specifications". The article can be read from (HTTP://www.brooktrout.com/products/tr114/tr_specs.htm) under (Brooktrout Technology, Inc. Home Page; HTTP://www.brooktrout.com/) of the Internet.

"Understanding the advantages of a Co–processed modem". The article can be read from (HTTP://www.puredata.com/class1.htm) under (Puratedata—Home Page; HTTP://www-.puredata.com/) of the Internet.

"SatisFAXtion 2000/4000 multichannel fax server modems". The article can be read from (HTTP://www.pure-data.com/s2k4k.htm) under (Puratedata—Home Page; HTTP://www.puredata.com/) of the Internet.

"Class Modem and GammaFax—Two Apporaches to Computer –Based Fax". The article can be read from (HTTP://www.gammalink.com/gamma/products/class.modems.h-tml) under (Gammalink WWW Pages; HTTP://www.gammalink.com/) of the Internet.

"GammaFax CP–4/SC, CP–6/SC & CP–12/SC Multiline Fax Boards". The article can be read from (HTTP://www-.gammalink.com/gamma/products/sc.html) under (Gammalink WWW Pages; HTTP://www.gammalink.com/) of the Internet.

"Rockwell R9MFX MONOFAX specification". From : Rockwell International Corporation, R96MFX 9600 bps MONOfAX Modem specification.

"Intel article—8259A Programmable Interrupt Controller". From book: Intel, Microprocessor and Peripheral Handbook, vol. I Microprocessor 1988, pp. 2–271 to 2–294.

*Primary Examiner*—Edward L. Coles
*Assistant Examiner*—Madeleine Au Nguyen
*Attorney, Agent, or Firm*—Samuel A. Kassatly

[57] ABSTRACT

A system or a board that interacts with a processor and multi I/O devices such as high-speed facsimile modems. The processor inputs/outputs data to I/O devices. Each I/O device includes an indicator, such as an Interrupt Request output, to signify a request that the I/O device will output or input data. If the indicator signifies a request, the processor will input data from or output data to the I/O device within a predetermined period Ti, in order to prevent the data from being lost. To this end, the new system or board includes a timer that periodically interrupts the processor and causes it to execute an interrupt service at a period T, where T<=Ti, whereupon the processor detects the indicators of I/O devices, and reads data from or writes data to any I/O device that signals a request.

16 Claims, 3 Drawing Sheets

SYSTEM ARCHITECTURE FOR MULTIPLE INPUT/OUTPUT DEVICES

BACKGROUND OF THE INVENTION

1. Field of the Invention

The present invention is directed toward data transfer methods between a processor and input/output (I/O) devices such as facsimile modems. The invention particularly relates to computer interrupt technology, and more specifically to a new interrupt hardware and software architecture for multiple I/O devices including multi-line facsimile boards.

2. Description of the Prior Art

Computers are increasingly used to service multiple I/O devices, such as facsimile modems, keyboards, sensors and other computers or processors. However, a major problem that limits the expanding use of multiple computer-based I/O devices is that the computer has limited interrupt inputs and limited communication ports. A computer readily supports two serial ports, with the hardware generally providing for up to four serial ports (COM 1 through COM 4). However, exceeding four serial ports currently presents problems. For example, in order to run 24 or 30 facsimile channels (lines) in a computer, it is not possible to simply architect a COM 1 through COM 30 solution.

The foregoing problem is particularly accentuated in the design of facsimile servers, multi-line fax-on-demand systems, facsimile store-and-forward node systems, facsimile packet-switched node systems, and facsimile broadcast systems, which need multiple high-speed facsimile channels to simultaneously service multiple subscribers in a computer system. For instance, in a facsimile packet-switched node, data from a plurality of facsimile machines are sent together over a common channel, and therefore multiple modems are needed in the node to service multiple subscribers.

High-speed facsimile modem such as Class 1 modem communicates to the host computer by way of an interrupt driven, with each interrupt occurring on a character-by-character basis. Since most faxes go out at high-speed such as 9,600 BPS or faster, the serial port would have to run at 19,200 BPS in order to feed the facsimile modem fast enough. At this speed, there is an interrupt required every 400–500 used. As a result, if for instance the computer supports ten facsimile modems, the computer will be interrupted every 40 to 50 used in order to read in the next character to the serial port, thus causing interrupt overload. Interrupt overload is highly undesirable since it degrades the computer general performance by forcing it away from other tasks to service an interrupt and then returning to continue the previous task.

The intelligent facsimile boards, such as GammaFax (a registered trademark of Dialogic), TR114 series (a registered trademark of Brooktrout), and SatisFAXtion series (a registered trademark of Pure Data), are developed to resolve above problems. For each facsimile channel of the intelligent facsimile board, a processor is dedicated to service a high-speed facsimile modem. So, when the board supports multi facsimile channels, it has to include multi processors, which renders that board expensive and relatively large in size, with complicated hardware designs. For example, a GammaFax CP-6/SC board includes six facsimile modems, six 20 MHz microprocessors, six 64 KB memory and six system bus control circuits.

Even if the computers were dedicated for the facsimile system only, most multi-line higt-speed facsimile systems still have to be established by using the intelligent facsimile board because of the limited interrupt inputs and the interrupt overload of the computer. The facsimile system based on such facsimile boards is expensive and requires more technologic maintenance, because such facsimile boards are complicated. Though the speed of the computer is becoming faster and faster, such as from the 8086 PC to the present Pentium 5 PC, the computer still tends to support one high-speed facsimile modem only such as Class 1 modem because of conventional interrupt method.

In general, an I/O device has an Interrupt Request output and status bits. When the I/O device has a request to input or output data, it sets the status bits and/or interrupts the computer by means of the Interrupt Request output. The computer responds to the I/O device within a period Ti after the I/O device signals the request, in order to prevent data from overrunning. For example, when a facsimile modem is receiving data, if the computer does not timely read the received data byte from the data buffer of the modem within the period Ti, the modem will continue to write the subsequently new received data byte to the data buffer and data might be lost. On the other hand, when a facsimile modem is transmitting, if the computer does not write the next transmitted data byte to the modem within the period Ti, the modem will not have the subsequent data byte on time, and it will erroneously transmit the data.

It should be noted that the I/O device such as higt-speed facsimile modem may very frequently and very randomly or at any time signify the interrupt request, however, when the I/O device such as facsimile modem signifies a request, it will allow a short period for the computer to respond, and if the computer can respond the request within the period, the computer will service the I/O device correctly.

FIG. 3 shows a conventional computer (CPU) 1 that services multi facsimile modems 2, 3 and 5. An interrupt requests IQR 2A, IQR 3A and IRQ 5A of the facsimile modems 2, 3 and 5, respectively, are connected to a programmable interrupt controller (PIC) 4. It should be noted that this conventional design uses multiple interrupt request inputs of the computer 1. After the facsimile modems begin communication, when any facsimile modem 2, 3 or 5 requests a data byte, it sends an interrupt request signal to PIC 4 by its IRQ output 2A, 3A or 5A. It should also be noted that this conventional design enables the interrupt request to the computer 1 from the multi facsimile modems 2, 3 or 5, as opposed to disabling the interrupt requests to the computer 1 from the multi facsimile modems 2, 3 or 5 (as performed by the present invention). Then, the PIC 4 responds to the request (IRQ) of the facsimile modems 2, 3 or 5, and interrupts the CPU 1 by the IRQ output of the PIC 4. In response to the interrupt request IRQ of the PIC 4, CPU 1 goes to interrupt service and transfers a data byte for the facsimile modems 2, 3 or 5. In the method, if any facsimile modem has a request, it will independently interrupt the CPU 1, and the CPU 1 will execute an interrupt routine for the facsimile modem only, rather than the CPU executing an interrupt service to check and service the modems 2, 3 or 5 as performed by the present invention.

SUMMARY OF THE INVENTION

An object of the present invention is to provide a new method for enabling the data transfer of a system with multiple I/O devices, such as a processor with multiple modems and facsimile modems.

Another object of the present invention is to provide a new method that allows a microprocessor or a computer, such as an IBM compatible x86 PC, to service multiple I/O devices, such as multiple modems and facsimile modems.

Another object of the present invention is to use a single interrupt to service multiple I/O devices, such as multiple modems and facsimile modems.

Still another object of the present invention is to provide a new architecture for multiple I/O interfaces such as multiple serial ports and parallel ports in a computer system.

Briefly, the foregoing and other objects and features of the present invention are realized by a new system and/or a board that interacts with a processor and multiple I/O devices. The processor reads or inputs data from input devices, and writes or outputs data to output devices. Each I/O device includes an indicator, such as an Interrupt Request output and status bits, to signal a request that the I/O device will output or input data. The processor detects or reads the indicator to determine whether the I/O has made or initiated a request. If the indicator signals a request, then the processor should respond to such a request and to input data from, or to output data to the I/O device within a predetermined period Ti, in order to prevent the data from being lost. To this end, the new system and/or board includes a timer that periodically interrupts the processor and causes it to execute an interrupt service at a period T (between two interrupt services), where T is less than or equal to Ti, whereupon the processor polls and reads the indicators of the active I/O devices, responds to any I/O device that signals a request, and further reads data from or writes data to any I/O device that signals a corresponding request. one advantage of the present system is that a single computer can service multiple modems, such as more than 32 high-speed facsimile modems or class 1 modems, and is not limited to four serial ports as is the case with conventional designs. In addition, the present system is capable of supporting data transfer using serial ports and parallel ports, between the processor and I/O devices.

Another advantage of the present system is that a single processor can service multiple I/O devices, which reduces cost and space, as compared with conventional devices such as the GammaFax CP-6/SC board which uses six processors.

Still another advantage of the present invention is that the number of interrupts from the multiple I/O devices such as high-speed facsimile modems is substantially reduced, which improves the computer general performance and eliminates interrupt overload.

BRIEF DESCRIPTION OF THE DRAWINGS

The above and other features of the present invention and the manner of attaining them will become apparent, and the invention itself will be best understood, by reference to the following description and the accompanying drawings, wherein.

DESCRIPTION OF THE PREFERRED EMBODIMENT

Figure 1:
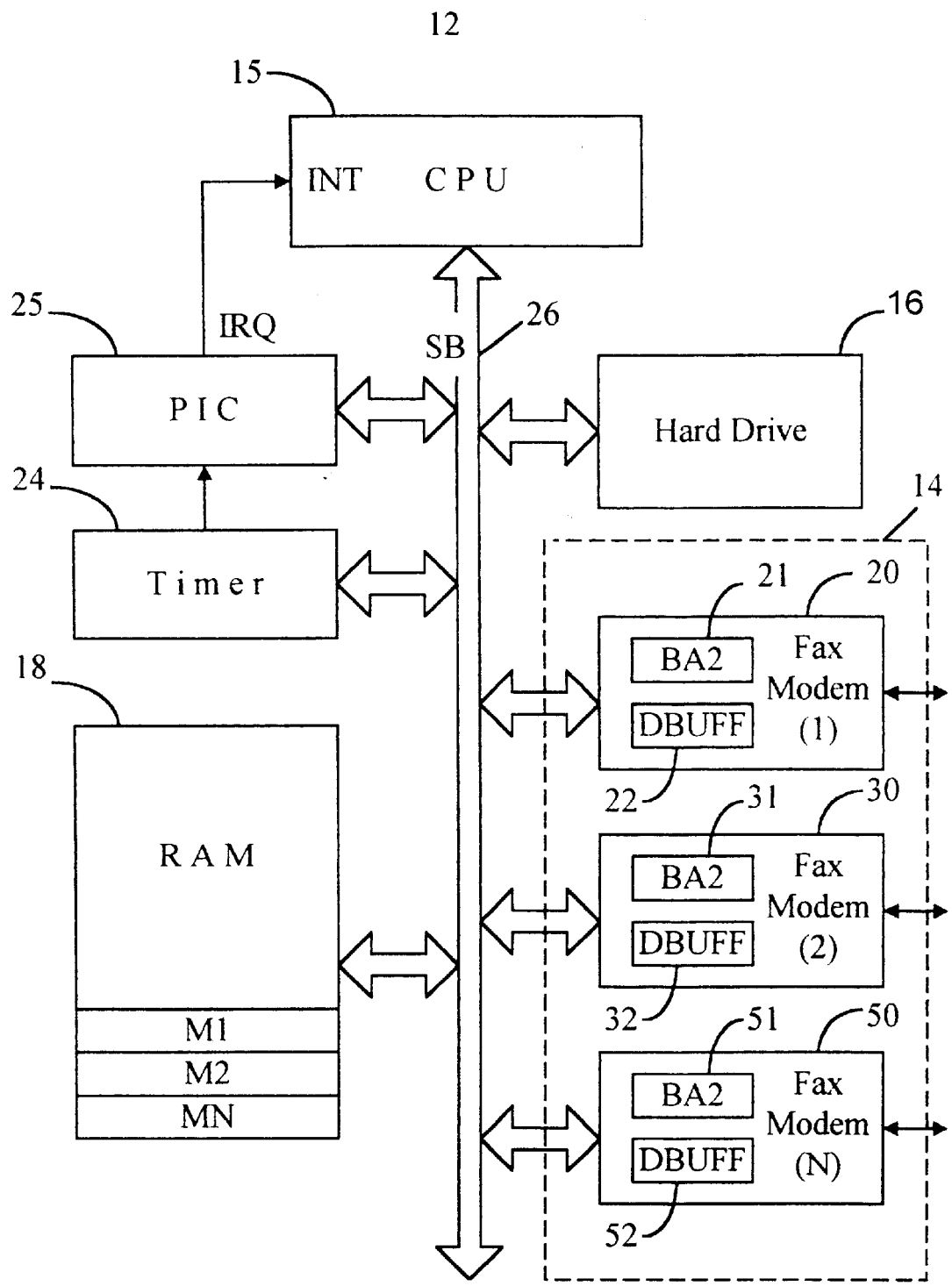
FIG. 1 is high level block diagram of a fax-on-demand system constructed in accordance with one embodiment of the present invention.

Referring to FIG. 1, there is shown in block form a fax-on-demand system 10 which is constructed in accordance with one embodiment of the present invention. The system 10 generally includes a processor or computer 12 such as an IBM compatible 386 PC, and an I/O board 14 comprised of several I/O devices such as multiple Rockwell's R96MFX MONOFAX (a registered trademark of Rockwell) facsimile modems 20, 30 and 50. In one embodiment according to the present invention each facsimile modem 20, 30, 50 is set to a parallel data mode. It should however by understood that other components of the system 10 may alternatively be used.

The R96MFX facsimile modem is a high-speed synchronous 9600 bits per second (bps) half-duplex modem, with the following settings:

1. Parallel Data Mode (PDM). When control bit PDM is a 1 and the modem is a transmitter, it accepts data for transmission from DBUFF. When PDM is a 1 and the modem is a receiver, the modem provides the received data to the host using DBUFF.
2. Data Buffer (DBUFF). In the parallel data mode, the host obtains received data byte from the modem by reading a data byte from DBUFF; the host sends data to the modem to be transmitted by writing a data byte to DBUFF.
3. Buffer Available 2 (BA2). When set to a 1, status bit BA2 signifies that, when the modem is in parallel data mode, it has read register DBUFF when transmitting (buffer becomes empty), or it has written register DBUFF when receiving (buffer become full). These conditions can also cause IRQ (Interrupt Request) to be asserted.

Once BA2 is set to 1 by modem, when the modem is transmitting, the following data byte will be written to the DBUFF within a period Ti, in order to prevent the modem from losing the transmission of the following data byte.

Once BA2 is set to 1 by modem, when the modem is receiving, the data byte will be read from the DBUFF within a period Ti, in order to prevent the data byte from losing because the modem may write following new received data byte into the DBUFF.

When the R96MFX facsimile modem operates at its highest speed of 9600 bps, the period Ti is about:

Ti=1 second* 1 byte/9600 bps,

Ti=1000 ms* 8 bits/9600 bps,

Ti=0.83 ms.

When a modem, i.e., 20, 30 or 50 is a transmitter, it accepts data for transmission from DBUFF 22, 32 or 52, respectively, and sets a status bit BA2 21, 31 or 51, respectively, to 1 to signify that it has read register DBUFF 22, 32 or 52 which buffer (DBUFF) becomes empty and need following new data. When a modem, i.e., 20, 30 or 50 is a receiver, the modem provides the received data to the processor 12 using DBUFF 22, 32 or 52 and sets a status bit BA2 21, 31 or 51 to 1 to signify that it has written on register DBUFF 22, 32 or 52 which buffer becomes full. Here, the status bit BA2 is the indicator.

In order to connect the modem 20, 30 or 50 to a transmission path, such as a phone line, a net control unit (not shown) is provided for each of the facsimile modems 20, 30 and 50. The net control unit is provided with a ring signal detector (not shown) and a dual tone multifrequency (DTMF) digit detector (not shown).

The processor 12 may include one or all of the following components: a central processing unit (CPU) 15, a hard drive 16, a memory 18, a timer 24 and a programmable interrupt controller (PIC) 25. The CPU 15 provides control flow for the modems 20, 30 and 50. The hard drive 16 may be included as part of the processor 12 in order to store facsimile documents. The memory 18 may be a random access memory (RAM) which allocates memory blocks M1, M2 and MN to service the facsimile modems 20, 30 and 50, respectively. The processor 12 includes a square wave generator, such as an Intel 8254 programmable interval timer working in mode 3, or the timer 24 for generating a periodic square wave signal with an exemplary period T=0.64 msec. It should be clear that other periods for the timer 24 may alternatively be selected as deemed appropriate. The PIC 25 may be an Intel 8259 programmable interrupt controller.

Figure 2:
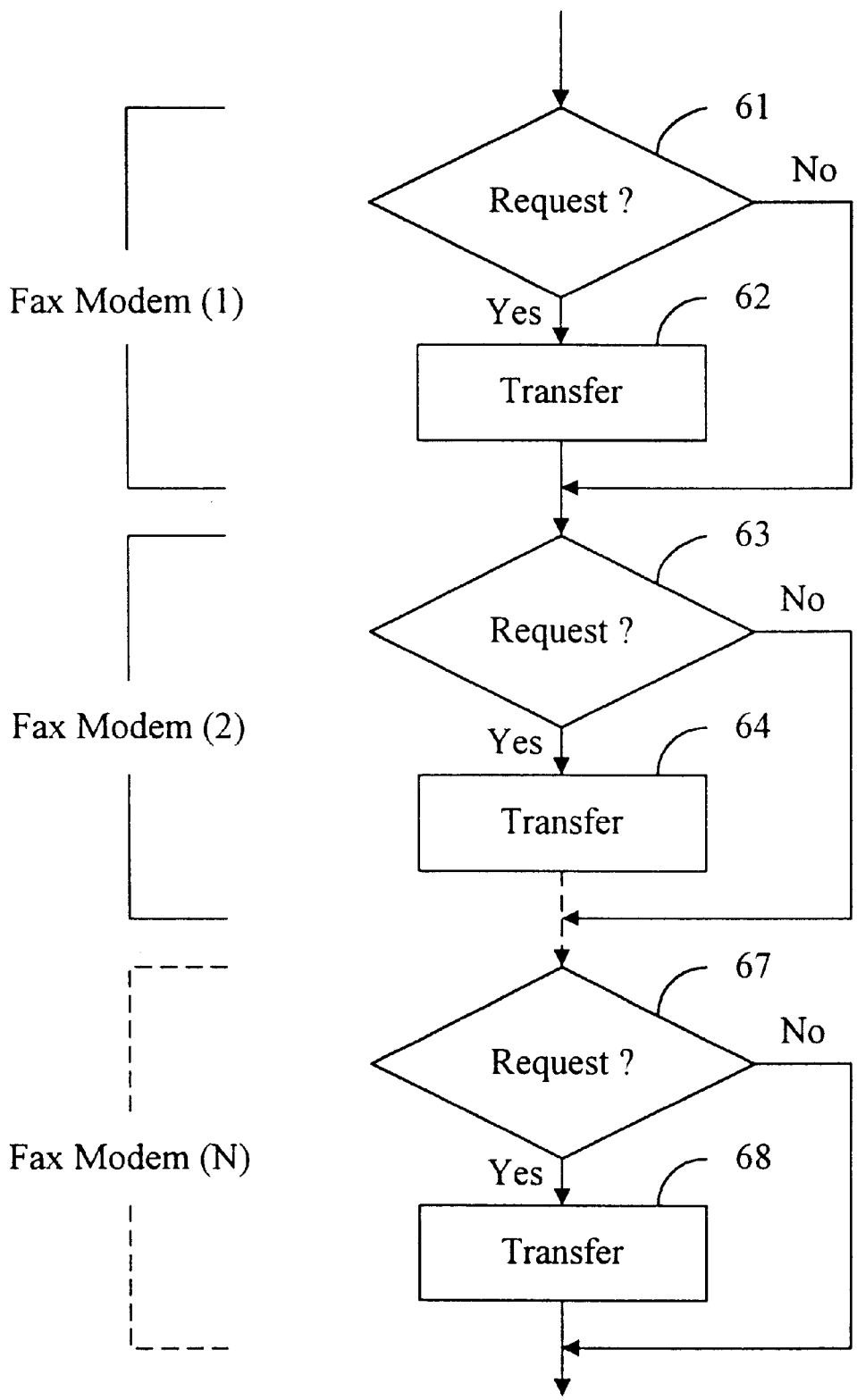
FIG. 2 is a high level flow chart showing an interrupt service used by the fax-on-demand system of FIG. 1.
Figure 3:
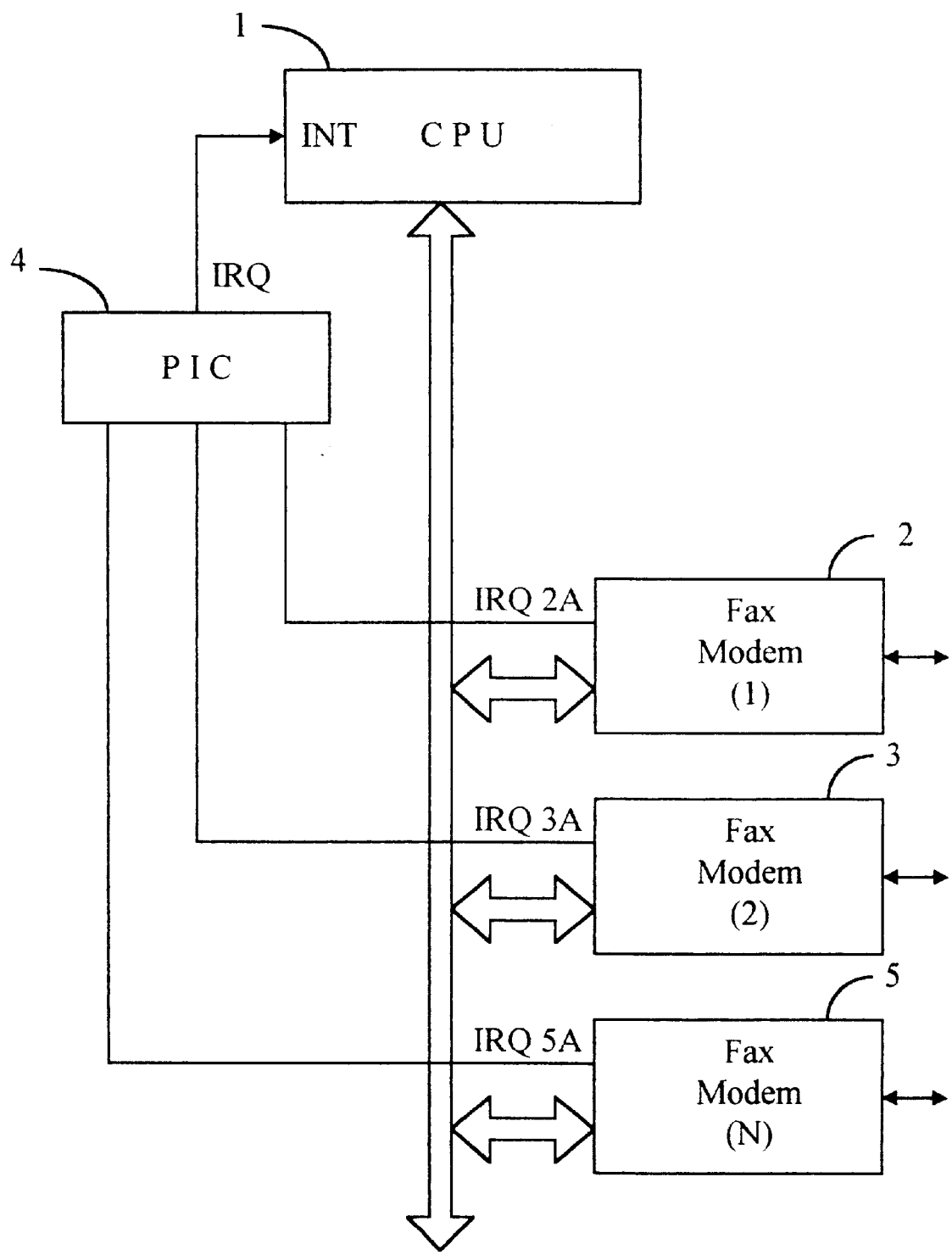
FIG. 3 is a high level block diagram of a conventional multi facsimile modems system.

The timer 24 is connected to the PIC 25 and periodically, at the end of the period T, causes the CPU 15 to execute an interrupt service, as it will be further described in relation to FIG. 2. It should be noted that the CPU interrupt period T (i.e., 0.64 msec) is less than the modem period Ti (i.e., 0.83 msec) of each facsimile modem.

The hard drive 16, the RAM 18, the timer 24, the PIC 25 and the I/O board 14 including the facsimile modems 20, 30, and 50 are connected to the CPU 15 via a system bus (SB) 26 for transmission of data and signals therebetween.

In use, when a subscriber wishes to demand a facsimile document from the fax-on-demand system 10, the subscriber performs the following functions:

1. Dials the telephone number of the fax-on-demand, for instance from the telephone handset of facsimile machine;
2. keys in a required 4-digit ID code, such as 1234; and
3. issues a START command.

The fax-on-demand system 10 will then send the facsimile document of the ID code 1234 to the subscriber at once.

In response to the subscriber, the fax-on-demand system 10 detects a call from the ring detector, receives the 4-digit ID code from the DTMF digit detector, and connects the facsimile modem such as the facsimile modem 20 to the phone line. The CPU 15 executes the transmits facsimile flow control, fetches the facsimile document corresponding to the ID code 1234 from the hard drive 16 to memory block M1 of the RAM 18.

An important part of the transmit facsimile flow control is for the processor 12 to send the transmitted data from M1 of the RAM 18 to the transmitter or the modem 20 for transmission to subscriber's facsimile machine. During the transmits facsimile flow control, when the CPU 15 controls modem 20 to transmit data, the modem becomes active. When the modem becomes active for transmitting, it receives transmitted data byte from the data buffer DBUFF 22, and if the modem reads the data byte from the DBUFF 22, it sets the BA2 21 to request the following new data byte. In response to that modem 20 becoming active, the periodic interrupt service begins to handle with modem 20, and to respond the request BA2 21 and to send transmitted data from M1 of the RAM 18 to the DBUFF 22 of the modem 20.

For the periodic interrupt service, at each periodic interrupt service triggered by the timer 24, the CPU 15 checks the bit BA2 or indicator (i.e., 21), and if the BA2 21 signifies a request, the CPU 15 will sequentially reads a data byte of the facsimile document from the memory block M1, and writes it to the DBUFF 22 of the facsimile modem 20 for transmission to the subscriber.

When the subscriber desires to send (or store) a facsimile document to the fax-on-demand system 10, the subscriber performs the following tasks:

1. Places (i.e., electronically) the facsimile document into the facsimile machine, and dial the telephone number of the fax-on-demand, for instance from the telephone handset of the facsimile machine;
2. keys in a 4-digit ID code, such as *1234; and
3. issues a START command.

The fax-on-demand system 10 receives the facsimile document at once, and store it in the hard drive 16 with the ID code 1234.

In response to the subscriber, the fax-on-demand system 10 detects a call from the ring detector, receives the * and the 4-digit ID code from the DTMF digit detector, and connects the facsimile modem such as the modem 30 to the phone line. The CPU 15 executes the receiving facsimile flow control.

An important part of the receiving facsimile flow control is for the processor 12 to obtain the received data from the receiver or modem 30 and store them to M2 of the RAM 18. During the receiving facsimile flow control, when the CPU 15 controls modem 20 to receive data, the modem becomes active for reception from subscriber's facsimile machine. When modem the becomes active, it stores received data byte to the data buffer DBUFF 32, and if the modem stores a data byte to the DBUFF 32, it sets the BA2 31 to request for the processor 12 to read the data byte and empty the DBUFF 32 for the following new received data byte. In response to that modem 30 becomes active, the periodic interrupt service begins to handle with modem 30, and to respond the request BA2 31 and to send received data byte from DBUFF 32 of the modem 30 to the M2 of the RAM 18.

For the periodic interrupt service, at each periodic interrupt service triggered by the timer 24, the CPU 15 checks the bit BA2 (or indicator) 31; and if BA2 signifies a request, the CPU 15 will read a data byte from DBUFF 32 and sequentially writes it to the memory block M2 of the RAM 18.

After all the data bytes of the facsimile document of the subscriber are received by the periodic interrupt services, the CPU 15 sends the facsimile document from memory block M2 to the hard drive 16 and stores it as a file with the corresponding ID code. The fax-on-demand system 10, through its facsimile modems 20, 30 and 50, can simultaneously service multiple subscribers.

Referring now to FIG. 2, it illustrates the interrupt service used in the system 10 of FIG. 1. At the end of the period T, the timer 24 independently and periodically informs or triggers the CPU 15 to execute the interrupt service. The interrupt service transfers data byte between the RAM 18 and the multiple facsimile modems 20, 30 and 50. It should be noted that for each interrupt, the interrupt service will service multiple facsimile modems 20, 30 and 50.

As shown in FIG. 2 at block 61, whenever the timer 24 interrupts the CPU 15, the CPU 15 executes the interrupt service and goes to the block 61. Blocks 61 and 62 describe the routine of having the CPU 15 service a first facsimile modem, i.e., 20. In block 61, the CPU 15 checks whether the facsimile modem 20 is active, i.e., whether it is transmitting or receiving data, and signifies a request of data transfer (the bit BA2 21 is set to 1). If the modem 20 active and has a request, the CPU 15 goes to block 62; otherwise the CPU 15 skips block 62.

At block 62, when the modem 20 acts as a transmitter, the CPU 15 sequentially reads a data byte from M1 of the RAM 18 and writes the data byte into the DBUFF 22. On the other hand, and when the modem 20 acts as a receiver, the CPU 15 reads a data byte from the DBUFF 22, and sequentially writes the data byte into M1 of the RAM 18.

After the CPU 15 services the first modem 20, it proceeds to service the second facsimile modem 30. Reference is made to blocks 63 and 64. At block 63 the CPU 15 checks whether the modem 30 is active and signifies a request of data transfer (bit BA2 31 is set to 1). If the modem 30 is active and has a request, the CPU 15 proceeds to block 64. Otherwise, the CPU 15 skips block 64. At block 64, when the modem 30 acts as a transmitter, the CPU 15 reads a byte from memory block M2 of the RAM 18, and writes the byte into DBUFF 32. On the other hand, if the modem 30 acts as a receiver, the CPU 15 reads a byte from the DBUFF 32 and writes the byte into memory block M2 of the RAM 18.

Following the foregoing logic and routine, the CPU 15 proceeds to blocks 67 and 68 and services modem (N). Finally, the CPU 15 terminates the interrupt service, returns to its original operation and repeats the interrupt service in the following periodic interrupt triggered by the timer 24.

The interrupt service is repeated and executed at the end of the period T, and each facsimile modem 20, 30 or 50 allows data transfer within a period Ti after it signifies a request (BA2 is set to 1). It should be noted that if the period T is less than or equal to the period Ti, then at least one interrupt is caused by the timer 24 within a period Ti. So, whenever any facsimile modem signifies a request of data transfer, the interrupt service triggered by the timer 24 can service the request in time, so that no data bytes from any of the modem 20, 30 or 50 are lost or overrun.

The RAM 18 works as data buffer, which accelerates data transfer for the interrupt service. In the fax-on-demand system 10, received or transmitted data may be directly transferred between the hard drive 16 and the modems 20, 30 and 50 without assistance from the RAM 18. In this case, it could take a longer time for the CPU 15 to service each modem, because the reading or writing of data from the hard drive 16 could be relatively slow. During the interrupt service, when the CPU 15 spends more time on some modems, such as the modem 20, data for other modems such as the modems 30 and 50 may overrun, because now the CPU 15 cannot service these modems 30, 50 on time.

The interrupt priority of the timer 24 is higher than some interrupts from other devices and some operations of the CPU 15, such as file transfer between the RAM 18 and the hard drive 16. For example, the CPU 15 may be reading a facsimile document from the hard drive 16 for the modem 20, but the timer 24 can interrupt its operation and cause the CPU 15 to transfer the data byte between the RAM 18 and the modems 30 and 50 if the modems 30 and 50 are active.

The I/O devices may have different Ti. For example, the first modem 20 has a period T1, while the second modem 30 has a period T2, and modem (N) has a different period Tn. In this particular example let us assume that T<T1, T<T2, and T<Tn, which can also be expressed by the general equation: T<Ti.

For the software architecture, the interrupt service can be programmed as an interrupt routine or multiple interrupt routines. For example, in the programming of multiple interrupt routines, a first interrupt routine services modem 20, and a second interrupt routine services modem 30. When the timer 24 interrupts the CPU 15, the first interrupt routine is executed, then the second interrupt routine is executed.

In the interrupt service, the data byte may be processed while it is being transferred. For example, the data byte is read from the RAM 18, converted to another format, and written to the modem; or, alternatively, the data byte is read from the modem, converted to another format and written to the RAM 18.

There are various methods that can be used to send received data from modems 20, 30 and 50 to RAM 18, or send transmitted data from RAM 18 to the modems. In the embodiment, we describe that the processor 12 directly writes/reads the parallel port DBUFF 22, 32 and 52 of the modem for data transfer, but computer or processor can use other accesses to I/O devices such as serial port, parallel port and DMA (Direct Memory Access) method.

The I/O device is generally connected to the computer by a serial port or a parallel port, and the modem is generally connected to the computer by a serial port. When the computer is transmitting data to another computer via the modem:

1. The processor writes a data byte to the serial port.
2. The serial port serializes the data and feeds it to the modem one bit at a time.
3. The modem sends it over the telephone line to the other computer system.
4. The serial port interrupts the processor to request another byte.

When the computer is receiving data from another system via modem:

1. The modem receives the data over the telephone line, and sends the serial bit stream to the serial port.
2. The serial port interrupts the processor when it has assembled 8 bits into a byte.
3. The processor jumps to the serial port's interrupt service routine.
4. The interrupt service routine inputs the data byte and stores it in memory.

The serial port such as Intel 8250 UART generally uses a register for transmitter's data and a bit of the status register for signifying transmitter's interrupt request; and use another register for receiver's data and another bit of the status register for signifying receiver's interrupt request.

Another I/O interface is the parallel port. When the parallel port is sending data to the output device:

1. The processor writes a data byte to parallel port.
2. The output device fetches the data byte.
3. The parallel port interrupts the processor to request another new data byte.

When the parallel port is receiving data from the input device:

1. The input device sends data byte to parallel port.
2. The parallel port interrupts the processor.
3. The processor jumps to the parallel port's interrupt service routine.
4. The interrupt service routine inputs the data byte and stores it in memory.

The parallel port such as Motorola 6821 PIA may use a register for output data and another register for input data and a bit of the status register for input and input interrupt request.

For each serial port or parallel port, it has the data registers or the data buffer, and it has the interrupt request bits or the indicators. When the interrupt request bit of the serial port or parallel port is set, the processor will response the request within a period Ti according to the feature of the I/O device that connects to the serial port or parallel port. If the computer includes multiple serial ports and/or parallel ports, it is possible to disable the interrupt requests to the processor from the multi serial ports and/or parallel ports, and to use the interrupt of a periodic Timer to interrupt the processor. In the Timer's interrupt service, the processor checks the interrupt request bits of the multi serial ports and/or parallel ports, and writes data to or read data from the multi serial ports and/or parallel ports that show the requests. A system architecture for multi serial ports and/or parallel ports can be based on the present embodiment of the fax-on-demand system described herein.

In the computer system with I/O devices, the I/O interfaces such as serial port and parallel port may be a part of the computer, (that is, the computer has the I/O interfaces) or a part of the I/O devices (that is, the I/O devices have the I/O interfaces). For convenience, when we mention the I/O device including modem, facsimile modem in our description, the I/O device includes the I/O interface. For example, when the modem connects to the computer via a serial port, the serial port is treated as a part of the modem even if the serial port is a part of the computer, and to write a data byte to the modem means to write the data byte to the serial port, and to read a data byte from the modem means to read the data byte from the serial port.

The present invention also includes modifications and improvements to the system 10. For instance, an I/O device generally has an IRQ output (Interrupt Request output, such as R96MFX's IRQ pin). In the traditional design, the IRQ output is connected to the PIC 25, and causes the CPU 15 to execute an interrupt service for this I/O device only. It therefore becomes possible to connect IRQ outputs of eight modems 20, 30 and 50 to an 8-bit data buffer (such as 74LS244 of Texas Instruments). Then, in the interrupt service, the CPU 15 reads the data buffer and determines which modems 20, 30 or 50 have requests, and accelerates the interrupt process. Here, the IRQ output is the indicator of the I/O devices.

Some I/O devices work slowly and allow longer period Ti after they signify the requests, such as during the R96MFX modem transmits the facsimile handshake signal at 300 bps. In this case, the CPU 15 may not check this facsimile modem at the period T. For example, the CPU 15 skip a few interrupt services of the Timer 24, then checks this modem afterwards. However, the CPU 15 does not skip the interrupt service of the remaining facsimile modems.

The timer 24 may have a shorter period T that is shorter than half of the period Ti of the facsimile modem (T<Ti/2). In this example, there are at least two interrupts within the period Ti, and the interrupt service might not process the request when it first detects the request, but it can process the request during the following interrupt services.

In the embodiment of fax-on-demand, when the processor supports one modem, its period is T, but when the processor supports 32 modems, its period remains T, and the number of interrupts is identical in both cases. So the number of interrupts for the processor does not increase, i.e., overload, when the number of modems increase in a computer system. For example, if the processor supports 32 facsimile modems, in one (1) second, in our method the computer receives about 1s/0.63 ms=1587 interrupts, (i.e., the computer receives one interrupt in each 630 us); but in the conventional design the computer receives 32*1s/0.83 ms=38554 interrupts, (i.e., the computer receives one interrupt in each average 26 us).

The present system 10 may be used in various commercial applications. A few of these applications are described below.

Network Facsimile Servers

Network facsimile servers are becoming increasingly popular for providing means with which to control and optimize facsimile communication. The user simply indicates the facsimile number, and the facsimile server does the rest. Incoming facsimiles can be directed back to individual workstations as well.

E-Mail Facsimile Gateways

With an E-mail facsimile gateway a business can expand its mail system by adding facsimile as an additional messaging capability. This extends the convenience of E-mail communications beyond the network boundaries. With an E-mail facsimile gateway, all users can send and receive facsimiles from within the E-mail package.

Mini/Mainframe Facsimile Servers

Many mini/mainframe facsimile servers work in the same way as LAN-facsimile servers: users can send and receive facsimiles from their terminals.

Broadcast/High-Volume Faxing

This feature is used to send the same information to a large number of people (fax telemarketing).

Facsimile on Demand

For example, a publisher wishes to deliver information upon requests from subscribers, users or members of the public. The system 10 enables public selective access of the informed desired to be delivered or published.

Facsimile Mailbox/Multi-Media Mailbox

Using this system, a user is able to retrieve his or her facsimiles from any remote location.

Digital Store-and-Forward (Via Packet Networks)

This feature is particularly useful for international facsimile traffic. The facsimiles are sent over data networks as data packets. One such facsimile packet-switched node is described in the co-pending patent application Ser. No. 08/210,889 filed on Mar. 18, 1994, by the same application, which is incorporated herein by reference in its entirety.

Store-and-Forward

By using this feature, the system 10 is capable of receiving a facsimile and forwarding or broadcasting it to other users in the system.

While specific embodiments of the system with multiple I/O devices have been illustrated and described in accordance with the present invention, modifications and changes of the apparatus, parameters, use and operation will become apparent to those skilled in the art, without departing from the scope of the invention.

What is claimed is:

1. A facsimile system comprising in combination:

a processor for performing control operations;

two or more facsimile transmitter modems, each of which including data buffer and an indicator that, when set, signifies a request that within a following period Ti said data buffer ready to receive transmitted data;

and/or two or more facsimile receiver modems, each of which including data buffer and an indicator that, when set, signifies a request that within a following period Ti said data buffer store new received data;

memory for storing data to be written to said data buffers of said two or more transmitter facsimile modems or data read from said data buffers of said two or more facsimile receiver modems;

interrupt means for periodically interrupting said processor at a period T, and said period T being less than or equal to said period Ti; and said processor executing an interrupt service when said interrupt means interrupts said processor, such that said interrupt service is for any of said two or more transmitter facsimile modems if said indicator signifies a request data read from said memory and written to said data buffer in said interrupt service or in interrupt services to follow, and for any of said two or more receiver facsimile modems if said indicator signifies a request data read from said data buffer and written to said memory in said interrupt service or in interrupt services to follow.

2. A facsimile system in accordance with claim 1, wherein data are read from said data buffer and are written to said memory; and wherein data are read from said memory and are written to said data buffer are processed.

3. A system with multiple Input/Output devices comprising in combination:

a processor for performing control operations;

a memory;

two or more input devices, each of which including data buffer and an indicator that, when set, signifies a request that within a following period Ti, said data buffer storing input data;

two or more output devices, each of which including data buffer and an indicator that, when set, signifies a request that within a following period Ti, said data buffer being ready for output data;

interrupt means for periodically interrupting said processor at a period T, and said period T being less than or equal to said period Ti; and said processor executing an interrupt service when said interrupt means interrupts said processor, such that said interrupt service is for any of said two or more input devices if said indicator signifies a request data read from said memory and written to said data buffer in said interrupt service or in interrupt services to follow, and for any of said two or more output devices, if said indicator signifies a request data read from said data buffer and written to said memory in said interrupt service or in interrupt services to follow.

4. A system in accordance with claim 3, wherein data are read from said data buffer and are written to said memory; and wherein data are read from said memory and are written to said data buffer, said data are processed.

5. A system in accordance with claim 3, said input/output devices include modems.

6. A system in accordance with claim 3, said input/output devices include input/output interfaces.

7. A system in accordance with claim 6, wherein said input/output interfaces include two or more serial ports.

8. A system in accordance with claim 6, wherein said input/output interfaces include two or more parallel ports.

9. A system in accordance with claim 6, wherein said input/output interfaces include one or more serial ports and one or more parallel ports.

10. A facsimile system in accordance with claim 1, said period T is constant.

11. A facsimile system in accordance with claim 1, said period T is variable.

12. A system in accordance with claim 3, said period T is constant.

13. A system in accordance with claim 3, said period T is variable.

14. A method for reading and writing data with multiple Input/Output devices comprising:

using a processor to perform control operations;

using two or more input devices, each of which including a data buffer and an indicator that signifies a request occurring within a following period Ti said data buffer store input data;

and/or using two or more output devices, each of which including a data buffer and an indicator that signifies a request occurring within a following period Ti said data buffer need output data;

periodically interrupting said processor at a period T being less than or equal to said period Ti, and said processor executing an interrupt service, such that said interrupt service is for any of said two or more input devices if said indicator signifies a request data read from said data buffer, or for any of said two or more output devices, if said indicator signifies a request data written to said data buffer.

15. A method in accordance with claim 14, said period T is constant.

16. A method in accordance with claim 14, said period T is variable.

* * * * *